United States Patent Office 2,946,716
Patented July 26, 1960

2,946,716
METHOD OF CONTROLLING AND ERADICATING MITES AND TICKS

Frederick A. Hessel, Montclair, N.J., assignor to General Aniline & Film Corporation, New York, N.Y., a corporation of Delaware No Drawing. Filed June 27, 1958, Ser. No. 744,927

3 Claims. (Cl. 167—22)

This invention relates to a process of controlling and eradicating mites and ticks attacking chlorophyllaceous plants.

The order Acarina of the class Arachnida comprises more than 18,000 species of mites and ticks. A number of these species are of economic importance as pests of agricultural and floricultural crops. The majority of common insecticides are of little value as miticidal agents. As a matter of fact, the large usage of DDT and other chlorinated hydrocarbon insecticides have materially helped to increase the mite population on many crops due to the destruction of their normal predators without appreciable injury to the mites. In recent years specific miticidal agents such as "Aramite" (2-p-tert-butyl phenoxy)-1-methyl ethyl 2-chloroethyl sulfite and "Ovotran" (parachloro phenyl parachloro benzene sulfonate) have found substantial commercial use not only to kill mites, but also to prevent the hatching of eggs. These compounds are usually formulated as dusts, wettable powders or emulsifiable concentrate and are all insoluble in water.

I have found an improved method while employing a new class of miticidal agents which are not only active against mites such as meta *Tetranychus ulmi*, *Tetranychus bimaculatus*, and *Tetranychus atlanticus*, but also prevent the hatching of eggs (ovicides) and are readily water soluble thus simplifying application to chlorophyllaceous plants.

The new class of miticidal agents consists of acetylenic diols of 4 to 6 carbon atoms. An aqueous solution of the diols may be employed as such or together with a small amount of a surface active or wetting agent. The concentration of the diol in the aqueous system may range anywheres from 0.05 to .5% by weight. In this range, ovicidal action is substantially complete. It is to be noted at the outset that the ovicidal action is obtained with or without the presence of a surface active or wetting agent, as will be shown hereinafter. The nature or character of the surface active or wetting agent is immaterial so long as it is soluble in water. Accordingly, any of the commercially available water soluble surface active or wetting agents may be employed. I prefer however, to employ high molecular weight alkyl phenoxy polyoxy ethylene ethanols commercially available under the brand names of "Igepal" and "Triton." The presence of the surface active agent gives better spreading on the chlorophyllaceous leaves. In lieu of surface active or wetting agents, dust and wettable powders may be prepared from the acetylenic diols.

The acetylenic diols utilized as miticidal agents in accordance with the present invention are characterized by the following general formula:

$$HOCH_2(-C\equiv C-)_n CH_2OH$$

wherein $n$ is a positive integer of from 1 to 2.

As examples of such acetylenic diols, the following are illustrative:

$$HOCH_2C\equiv CCH_2OH$$

2-butyne-1,4-diol $$HOCH_2C\equiv C-C\equiv C-CH_2OH$$

Hexadiyne-2,4-diol-1,6

In order to demonstrate the miticidal activity of the foregoing acetylenic diols, the following testing procedure was employed:

An infested bean leaf, from a stock culture of mites, is placed on a bean leaf, 6–8 inches in height, growing in a 2½" clay pot. A sufficient number of mites for testing purposes (150–200) (counted by microscopic examination) will transfer from the excised leaf to the plant in a period of 24 hours. The bean plants, two per test, are placed on a revolving turntable and sprayed with a DeVilbiss spray gun at 40 pounds' pressure for 20 seconds. 80 ml. of the aqueous test solution is applied. This amount is sufficient to wet the beans to run-off. 80 ml. of either a water solution or a water solution containing a surfactant or wetting agent, in the same concentration as used in the miticidal solution, but without the candidate miticide, is also sprayed on the bean plants as a check or control solution. Plants are held at room temperature for a period of 48 hours at which time microscopic examination of mobility is made.

EXAMPLE I

Tetranychus atlanticus *mites*

| Miticide | Percent by weight of miticide in Water solution | Avg. Number on bean plant | Avg. Number of dead mites after 48 hours | Ovicidal action, percent |
|---|---|---|---|---|
| 2-butyne-1,4-diol | .35 | 164 | 164 | 100 |
|  | .10 | 156 | 149 | 100 |
| hexadiyne-2,4-diol-1,6 | .35 | 172 | 170 | 100 |
|  | .10 | 162 | 162 | 100 |
| 2 - butyne - 1,4 - diol+0.01% wetting agent [1] | .35 | 158 | 158 | 100 |
|  | .10 | 164 | 162 | 100 |
| hexadiyne - 2,4 - diol - 1,6 +0.01% wetting agent [1] | .35 | 182 | 180 | 100 |
|  | .10 | 148 | 148 | 100 |
| water | | 160 | 0 | 0 |
| water+0.01% wetting agent [1] | | 168 | 0 | 0 |

[1] Surface active agent obtained by condensing 1 mole of nonyl phenol with 10 moles of ethylene oxide.

EXAMPLE II

Meta Tetranychus ulmi *mites*

| Miticide | Percent miticide in water solution | Avg. Number of mites | Avg. Number of dead mites after 48 hours | Ovicidal action, percent |
|---|---|---|---|---|
| 2-butyne-1,4-diol | .35 | 138 | 131 | 100 |
|  | .10 | 148 | 142 | 100 |
| hexadiyne-2,4-diol-1,6 | .35 | 166 | 160 | 100 |
|  | .10 | 158 | 153 | 100 |
| 2 - butyne - 1,4 - diol+0.01% wetting agent [1] | .35 | 160 | 154 | 100 |
|  | .10 | 162 | 157 | 100 |
| hexadiyne - 2,4 - diol - 1,6+ 0.01 wetting agent [1] | .35 | 170 | 165 | 100 |
|  | .10 | 156 | 151 | 100 |
| Water | | 170 | 0 | 0 |
| Water+0.01% wetting agent [1] | | 162 | 0 | 0 |

[1] Surface active agent obtained by condensing 1 mole of nonyl phenol with 10 moles of ethylene oxide.

EXAMPLE III

Tetranychus bimaculatus *mites*

| Miticide | Percent miticide in water Solution | Avg. Number of Mites | Avg. Number of dead mites after 48 hours | Ovicidal Action, percent |
|---|---|---|---|---|
| 2-butyne-1,4-diol | .35 | 160 | 160 | 100 |
|  | .10 | 158 | 157 | 100 |
| hexadiyne-2,4-diol-1,6 | .35 | 164 | 164 | 100 |
|  | .10 | 168 | 166 | 100 |
| 2-butyne-1,4-diol+0.01% wetting agent [1] | .35 | 166 | 166 | 100 |
|  | .10 | 154 | 152 | 100 |
| hexadiyne-2,4-diol-1,6+ 0.01% wetting agent [1] | .35 | 170 | 170 | 100 |
|  | .10 | 168 | 165 | 100 |
| Water |  |  | 0 | 0 |
| Water+0.01% wetting agent [1] |  |  | 0 | 0 |

[1] Surface active agent obtained by condensing 1 mole of nonyl phenol with 10 moles of ethylene oxide.

I claim:

1. A process of controlling mites and ticks attacking chlorophyllaceous plants which comprises applying to said plants an aqueous solution comprising 0.05 to 0.5% by weight of an acetylenic diol having the following general formula:

$$HOCH_2(-C{\equiv}C-)_nCH_2OH$$

wherein $n$ represents a positive integer of from 1 to 2.

2. The process according to claim 1 wherein the acetylenic diol is 2-butyne-1,4-diol.

3. The process according to claim 1 wherein the acetylenic diol is hexadiyne-2,4-diol-1,6.

References Cited in the file of this patent

UNITED STATES PATENTS

| 2,106,181 | Kreimeier | Jan. 25, 1938 |
| 2,413,803 | Tribit | Jan. 7, 1947 |
| 2,653,894 | Newman | Sept. 29, 1953 |

FOREIGN PATENTS

| 501,836 | Canada | Apr. 27, 1954 |

OTHER REFERENCES

King: U.S. Dept. Agr., Handbook No. 69, May 1954, pp. 92, 188.